United States Patent [19]

Karning et al.

[11] Patent Number: 4,810,088

[45] Date of Patent: Mar. 7, 1989

[54] LASER RANGEFINDER AND THERMAL IMAGER WITH ENHANCED SCANNING MIRROR CONTROL

[75] Inventors: Heinrich Karning, Heidelberg; Ekkehard Szillis, Mannheim; Wolfgang Weigel, Dossenheim, all of Fed. Rep. of Germany

[73] Assignee: Hughes Aircraft Company, Los Angeles, Calif.

[21] Appl. No.: 801,162

[22] Filed: Nov. 22, 1985

Related U.S. Application Data

[63] Continuation-in-part of Ser. No. 641,521, Aug. 16, 1984, abandoned.

[51] Int. Cl.[4] .......................... G01C 3/08; G01C 1/00
[52] U.S. Cl. ........................................ 356/5; 250/342; 250/347; 356/152
[58] Field of Search ................. 356/5, 152, 141; 89/41.06, 41 L; 250/342, 330, 332, 334, 347

[56] References Cited

U.S. PATENT DOCUMENTS

| | | | |
|---|---|---|---|
| 3,644,043 | 2/1972 | Jones et al. | 356/5 |
| 3,781,111 | 12/1973 | Fletcher et al. | 356/152 |
| 4,025,193 | 5/1977 | Pond et al. | 356/5 |
| 4,063,819 | 12/1977 | Hayes | 356/5 |
| 4,209,253 | 6/1980 | Hughes | 356/5 |
| 4,236,819 | 12/1980 | Green | 356/5 |
| 4,311,384 | 1/1982 | Keene | 356/5 |
| 4,311,385 | 1/1982 | Keene | 356/5 |
| 4,395,121 | 7/1983 | Nory et al. | 356/152 |
| 4,401,886 | 8/1983 | Pond et al. | 356/152 |
| 4,457,621 | 7/1984 | Harris et al. | 356/152 |
| 4,542,986 | 9/1985 | Berdanier | 356/5 |

FOREIGN PATENT DOCUMENTS 3104318  8/1982  Fed. Rep. of Germany ......... 356/5

*Primary Examiner*—Stephen C. Buczinski
*Assistant Examiner*—Linda J. Wallace
*Attorney, Agent, or Firm*—Ronald L. Taylor; V. G. Laslo; A. W. Karambelas

[57] ABSTRACT

An improved laser rangefinder and thermal imager with enhanced scanning mirror control is disclosed. Optical axes (11,12) are aligned parallel to each other. The system includes only one common thermal image/laser reception channel (8,9,10,11). The angular movement of scanning mirror 8 is compensated during the range finding operation. Synchronizing means (1,2,3,4) located in the beam path controls the movement of the scanning mirror. An improved method for controlling the movement of the scanning mirror which enhances the measuring range of the device is also disclosed. In order to receive $CO_2$ radiation of narrow bandwidth which is reflected from a target, the cyclical movement of the scanning mirror (8) is precisely controlled in order to position it favorably during the range measuring operation. The frequency of the scanning function is retarded so that the scanning mirror (8) is moved only through a fraction of the width of the image field. As a result, projections of the detector element (32) in the object plane which would otherwise be located in the outer areas of the laser pulse coincide relatively closely at the beginning and end of the range finding operation.

30 Claims, 7 Drawing Sheets

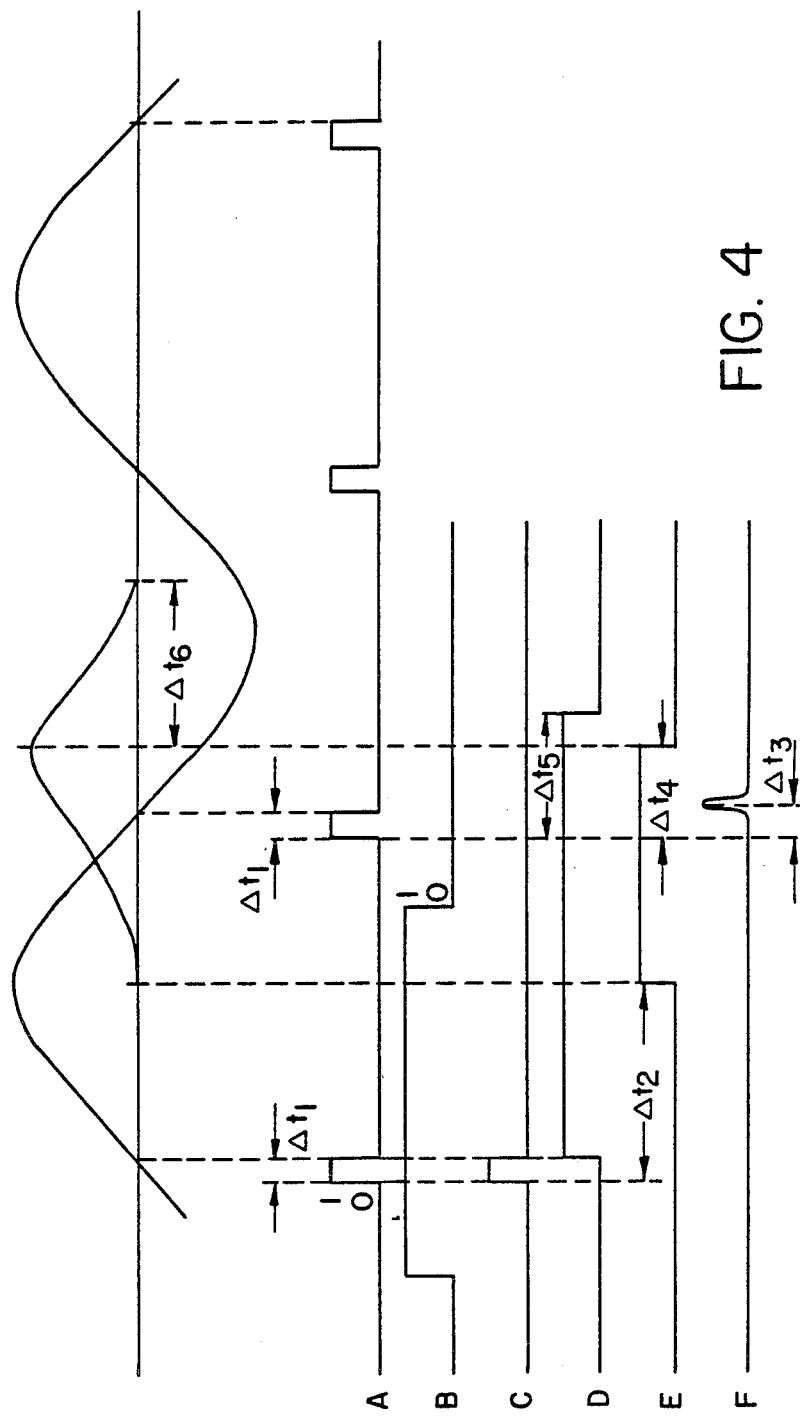

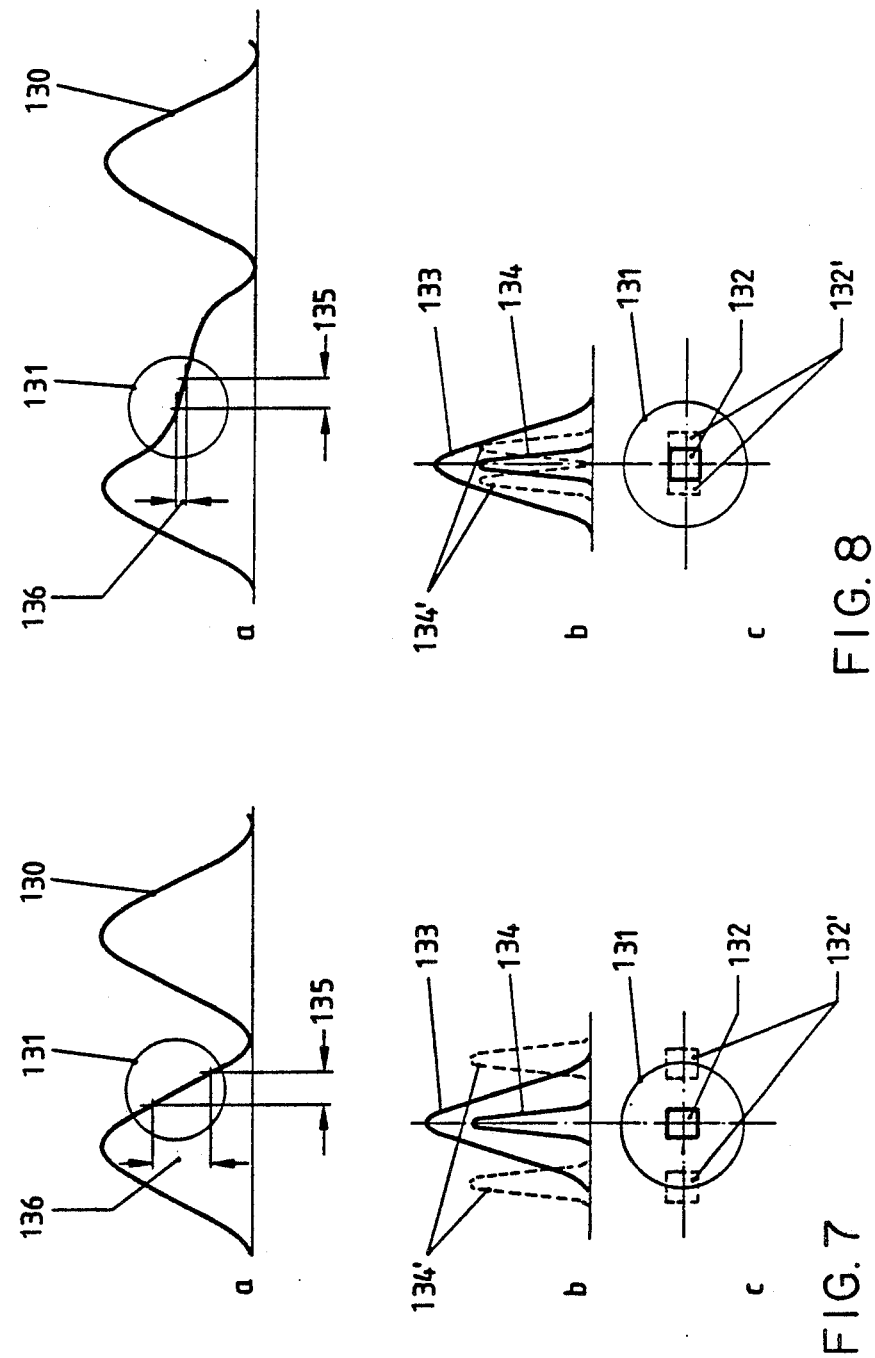

LASER RANGEFINDER AND THERMAL IMAGER WITH ENHANCED SCANNING MIRROR CONTROL

CROSS-REFERENCE TO RELATED APPLICATIONS

This patent application is a continuation-in-part of U.S. patent application Ser. No. 641,521, now abandoned, filed on Aug. 16, 1984.

The improvement over this original invention (U.S. Ser. No. 641,521, now abandoned, corresponding to German Patent Application No. P 33 29 588.3) which comprises the additional information disclosed in the present continuation-in-part application is described and claimed in German Patent Application No. P 34 15 062.5, which was filed in the Democratic Republic of Germany on Apr. 21, 1984. No claim of priority is made for the subject matter disclosed in German Patent Application No. P 34 15 062.5 under the Paris Convention.

Issued German Pat. Nos. DE-PS 3,048,809 and DE-OS 3,104,318 disclose methods and apparatus which pertain to the same technology.

BACKGROUND OF THE INVENTION

1. Field of the Invention

The present invention relates to methods and apparatus for a laser and thermal imaging device. The invention also includes a method for enhanced scanning mirror control.

2. Description of Related Art

German Patent Application No. P 32 09201.1 describes how narrow band, 10.6 $\mu$m $CO_2$ radiation bypasses the scanning element of a combined laser and thermal imaging device. $CO_2$ radiation is focused by a detector objective on one of at least two detector elements of the thermal imaging device. The result is that the $CO_2$ radiation, although it is received by means of the thermal imaging detector, it is not directed by the scanning mirror which is constantly changing its position. The advantage provided by the present invention that the angular movement of the mirror during the range measuring sequence need not be accounted for. As a consequence, when the laser pulse is triggered, a certain time interval (equal to the product of the mean range and twice the speed of light) would come into the range measuring operation. During this interval, the detector element of the thermal imaging device would have scanned a field of view of greater than the instantaneous detector field of view. This, in turn, means that false targets lying within this scanned field of view would be seen and measured, which would increase the false alarm rate, deteriorate the range resolution, and impair the system performance data.

SUMMARY OF THE INVENTION

The present invention advantageously reduces the angular movement of the scanning mirror in systems in which bypassing the scanning unit with $CO_2$ radiation is not possible.

The object of the improved invention is to provide for the best means of controlling the movement of the scanning element while concomitantly providing for the optimal angular position of the scanning element.

The claimed improvement employs continuous movement of the scanning element and reduces losses attributable to the scanning operation.

The scanning element, which is usually a mirror, is moved only slightly during the rangefinding operation. This operation requires only approximately 60 to 100 $\mu$s.

The solid angle of projection of the laser beam is approximately 0.4 to 0.7 milliradians. In thermal imaging devices which have high resolving power, the solid angle represented by the projected detector element is only approximately 0.15 milliradians or less. In systems where scanning errors are small, this gives rise to energy losses of approximately 8 dB. These energy losses are due to the geometry of the detector and the energy distribution of the laser spot. In order to keep these energy losses as small as possible, the deflecting means, which is parallel to the scanning element, is constructed as a spectrum divider. Such a spectrum divider reflects the thermal radiation in the direction of the detector and transmits the laser radiation which is formed into an image at the detector by a fiber optical system.

An appreciation of other aims and objects of the present invention and a more complete and comprehensive understanding of this invention may be achieved by studying the following description of a preferred embodiment and by referring to the accompanying drawings.

BRIEF DESCRIPTION OF THE DRAWINGS

FIG. 4 is a graph of the pulse sequence of a range measuring operation with electromechanical actuation of the synchronization means.

FIG. 5(*b*) illustrates an alternative embodiment of the schematic representation of the invention pictured in FIG. 1(*a*) in which the fiber optical system is replaced by a configuration of lenses.

FIG. 7 is a graph which reveals the normal scanning function of the scanning element. The energy distribution of the emitted and received laser pulses are shown in FIG. 7(*b*). The projection of the laser pulses are superimposed upon the positions of the detector element in the object plane in FIG. 7(*c*).

FIG. 8 shows the scanning function (a), energy distributions of the laser pulses (b), and projections of the laser pulses upon the detector element (c) when the movement of the scanning element is retarded.

DESCRIPTION OF THE PREFERRED EMBODIMENTS

Figure 1:
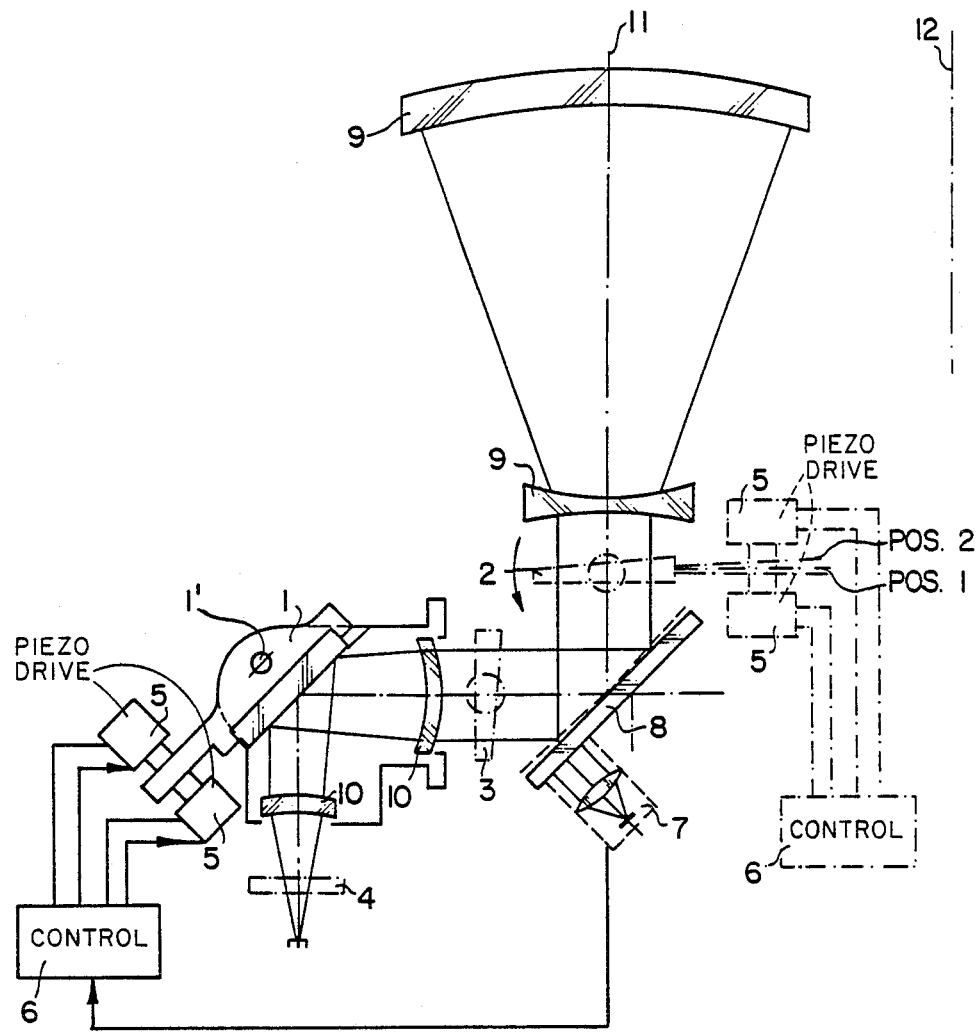
FIG. 1 is a schematic diagram of the present invention which shows three alternative possibilities for compensating the angular movement of the scanning mirror, shown for simplicity in one and the same principle diagram.

FIG. 1 is a schematic diagram of part of an optronic sighting apparatus which includes a thermal imager aiming device and a laser range finder. Thermal imager and laser receiver channel 9 is coupled to the laser transmitter which is indicated only by the optical axis 12 of the laser radiation. The optical axis or sight line 11 of the receiver channel 9 and the other axis 12 of the laser transmitter are parallel to each other. A portion of the emitted laser radiation is reflected by the target in the direction of the receiver channel and passes through receiver channel 9 together with the target and background radiation. This combined radiation beam is deflected by scanning mirror 8 which is shown at its rest position at 45° to the beam path. This radiation ultimately impinges upon a detector which is not illustrated in this drawing. The detector converts the radiation opto-electronically and supplies voltage signals to a light-emitting diode array (not shown), which converts the incoming infrared energy into visible light.

The invention compensates for the unwanted angular movement of the scanning mirror 8 during the range measuring operation. Deflection mirror 1 is positioned next to the two members of the detector objective 10 and pivots on axis 1′ which extends parallel to the scanning mirror axis. Piezo drive 5 and the associated control electronics 6 control the movement of the deflection mirror. In this way, the scanning mirror is held stationary during the range measurement.

The action of these optical elements are controlled by an electronic logic circuit.

Figure 2:
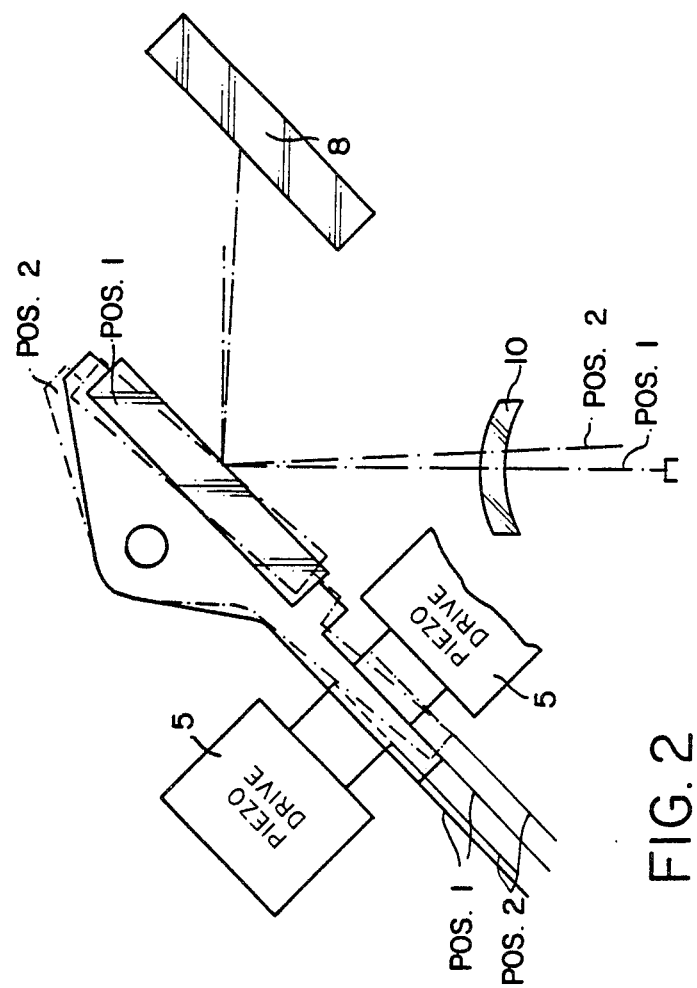
FIG. 2 shows the deflection mirror depicted in FIG. 1 in its two extreme positions.

The time interval shown in FIG. 4 must be longer than the scanning mirror cycle. A position sensor 7 detects the position of the scanning mirror 8 by sensing its movements at the rear of the mirror. When the scanning mirror 8 moves past a defined zero position, the compensation operation is initiated by adjusting the deflection mirror 1 by a definite amount so that its movements run synchronously to those of the scanning mirror. Various positions of the deflection mirror are are shown in FIG. 2. One extreme position 1 is illustrated by solid lines, and the other extreme position 2 is shown in broken lines. FIG. 4 depicts the superposition of the oscillation amplitudes of the deflection and scanning mirrors.

FIG. 4 comprises six pulse diagrams A through F which reveal the pulse sequence of a range measuring operation. Pulse diagram A represents a train of synchronizing pulses which coincide with the times at which the scanning mirror moves through its zero position. Pulse B is triggered by the operator when he depresses the range metering button. Pulse C is the output of an AND gate that has signals A and B as its input. This third diagram is a trigger pulse which triggers functions D, E, and F and is set when A and B are logically ONE or logically equivalent. Waveform D is an enable or unlocking pulse that is set for at least half a scanning mirror cycle. Pulse E is the activating pulse for the synchronization means which is generated after a time delay $\Delta t_2$ which compensates the measuring inertia and acceleration of the synchronizing means. Waveform F is a second synchronizing pulse which is generated after a time delay $\Delta t_1$ after the second A pulse, which occurs when the scanning mirror transits its defined zero position. The enable or unlocking pulse (D) triggers the laser pulse. The laser trigger pulse has been omitted here for clarity. Time interval $\Delta t_1$ is set so that the laser pulse leaves the device exactly at the instant of the actual zero passage (or the optical zero position) of the scanning mirror. At this instant, the activating pulse (A) has substantially compensated the actual movement by pivoting the synchronizing means. During the range measuring time, the scanning mirror is effectively stationary. The maximum range measuring time is about 100 micro seconds. A similar synchronizing pulse with a delay of $\Delta t_4$ resets the activating pulse (E) for the synchronizing means. The enable or unlocking pulse is also reset utilizing a delay interval $\Delta t_5$. The synchronizing means has an inherent time constant $\Delta t_6$. The scanning mirror is returned to the basic position necessary for thermal imaging mode and is locked into this position. The time displacement between synchronizing and laser pulses is denoted by $\Delta t_3$.

Figure 3:
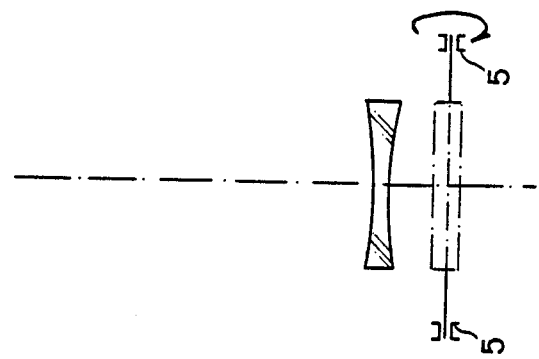
FIG. 3 is a side view of a rotary wedge shown in FIG. 1 with its mounting.

FIG. 1 shows two other alternative embodiments in dot-dash line. If a laser rangefinder and thermal imaging system includes a reflection mirror 1 which is fixed and does not pivot, such a system can be retrofitted by installing a rotary wedge pair 2, 3. One of the pair 2 is located between the receiving optical system 9 and the scanning mirror 8. The second wedge 3 is placed between scanning mirror 8 and the detector objective 10. The wedge 2 between the receiving optical system 9 and the mirror 8, its mounting means, and direction of rotation are shown in FIG. 3 in a side elevational view. As shown in FIG. 1, the deflection mirror 1 and rotary wedge pair 2, 3 may also be replaced by a plane plate 4 following the detector objective. The two synchronizing means can also be operated by a piezo drive and associated control electronics. Synchronizing movement can also be provided by electro- or acousto-optical methods which involve deflection of the radiation. All these synchronizing measures make it essential to be able to lock the optical axis 11 of the receiving channel. If electromechanical synchronizing methods and apparatus arm employed, the optical axis may be locked using electromechanical techniques. When electro-optical synchronizing means are used, a clamping circuit can be designed to lock the axis.

FIG. 5 is a schematic representation of a portion of an optoelectronic sighting device shown together with a thermal imaging sighting mechanism and a laser range finder. In this embodiment, the combined thermal imaging/laser reception channel 109 is coupled with an emitting laser so that its optical axis 112 extends parallel to the line of sight 111. Some of the radiation reflected by the target and characteristic radiation emitted by the target and the surrounding environment pass through the reception channel and are directed by a scanning element through optical deflecting means 101 to detector 123. The scanning element is shown here as a mirror 108. The detector 123 is designed to sense thermal and laser radiation. A light-emitting diode arrangement, which is not shown in this drawing, optoelectronically converts the sensed radiation into visible light. This aspect of the present invention is described above and forms the subject matter of the principal patent (U.S. Ser. No. 641,521, now abandoned, corresponding to German Patent Application No. P 33 29 588.3).

Figure 5A:
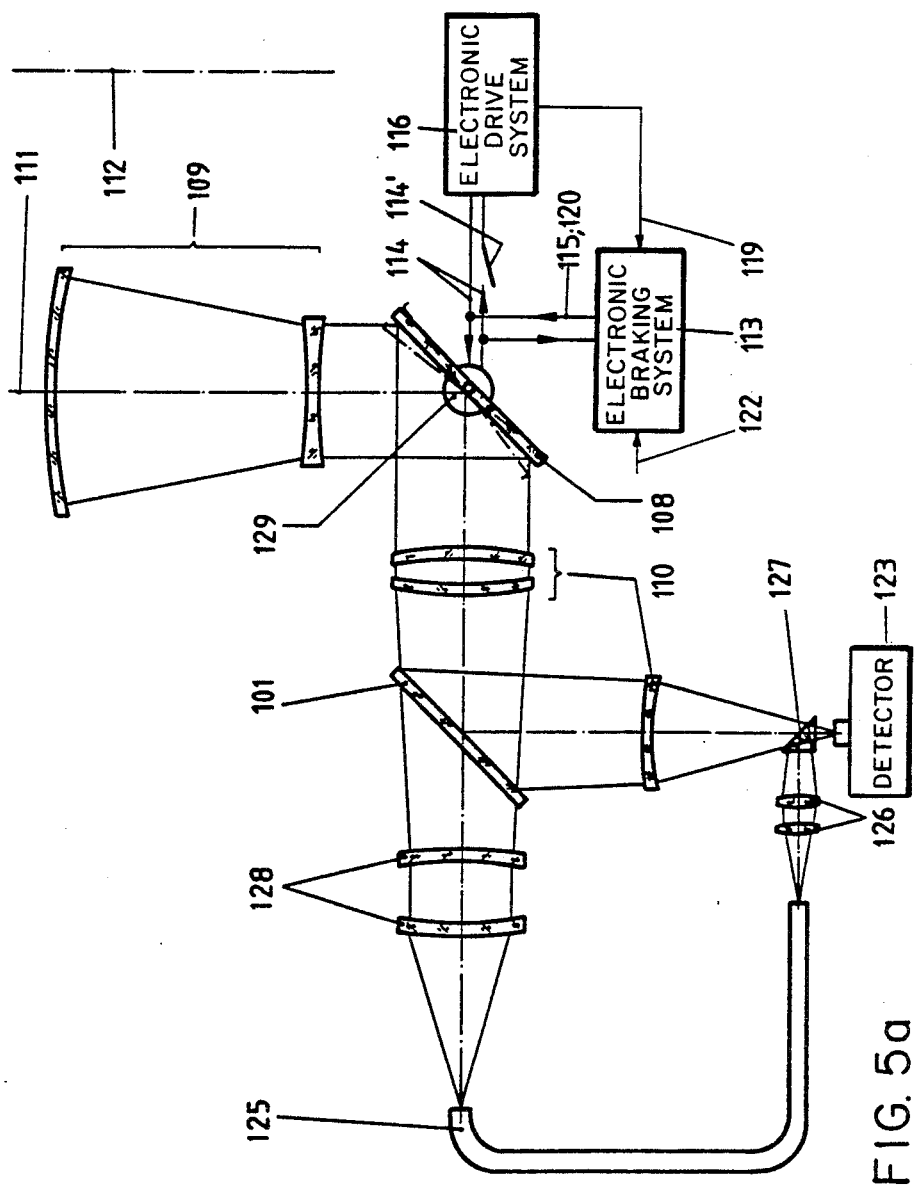
FIG. 5(*a*) is a schematic diagram of the present invention which depicts scanning element speed control means together with a fiber opitical system which conducts radiation from the scanning element to a detector.
Figure 5B:
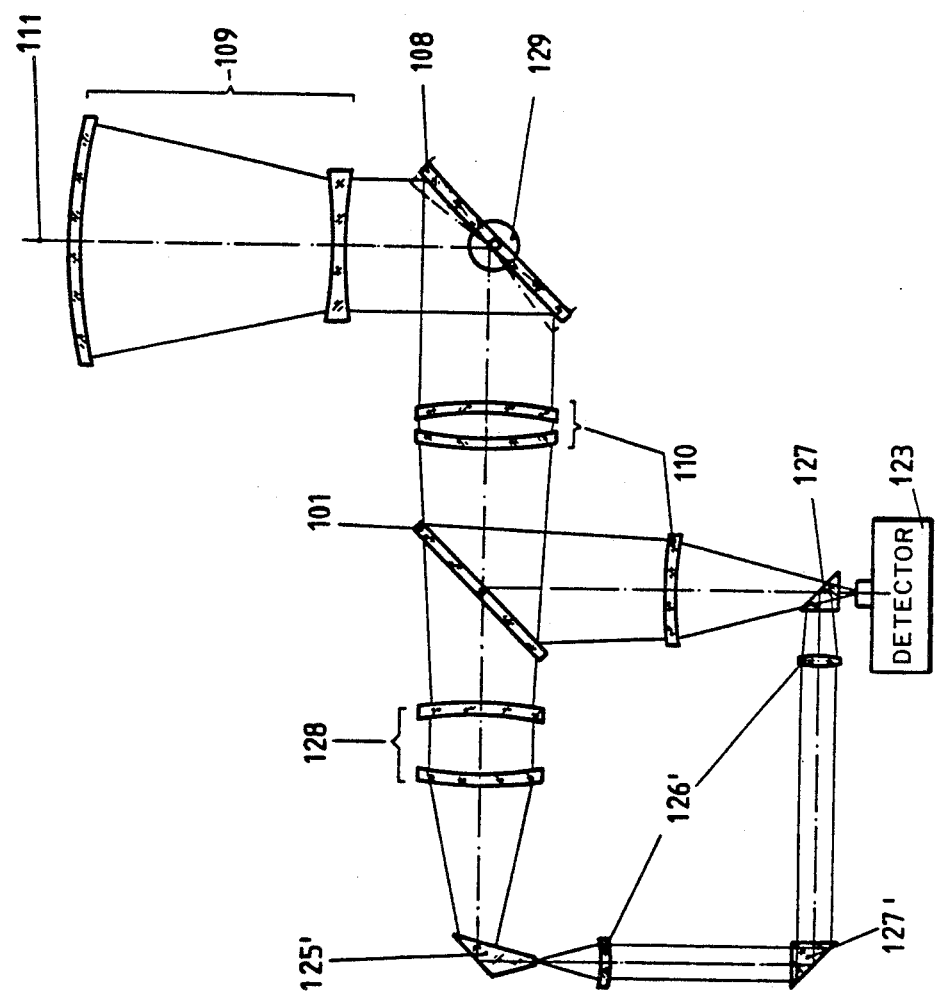
Figure 6:
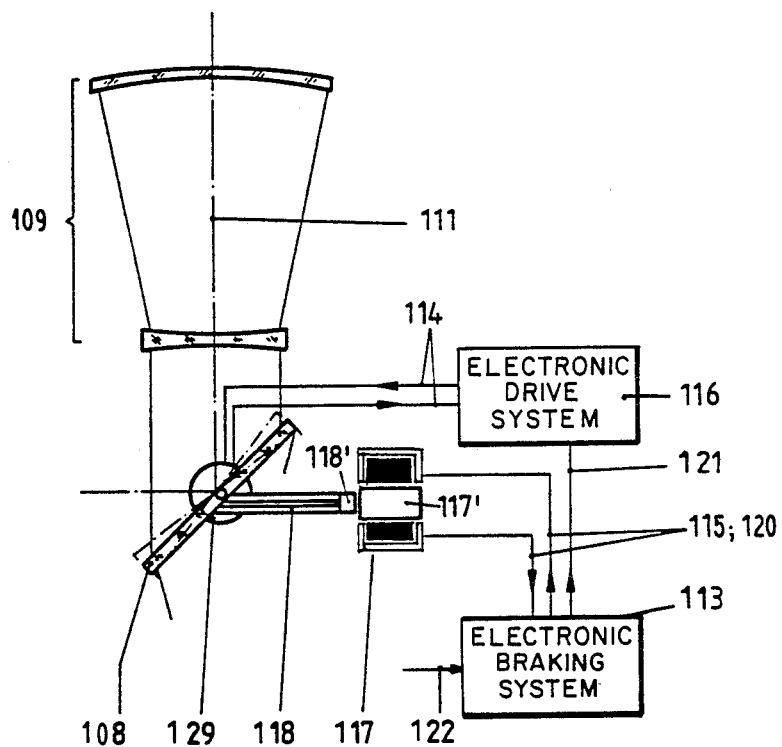
FIG. 6 depicts a braking device which controls the speed of the scanning element.

In FIG. 7a, graph 130 indicates the normal scanning function of the scanning mirror 101 (FIGS. 5 and 6). Graph 31 indicates the projection of the laser pulse in the object plane (target). Although they are not drawn to scale, the arrows 135 represent the time interval required for range finding. The arrows 136 indicate the course of the image of the detector element 132 in the object plane. In FIG. 7c, both laser pulse 131 and detector element 132 have been projected in the object plane. The solid line shows the central position, while the broken lines show the beginning and the end of the same detector element in the course of a range finding procedure. In FIG. 7b, curves 133 and 134 above the central position of the detector element 132 (FIG. 7c) illustrate the energy distribution of the emitted laser pulse and of the received laser pulse. The dashed line of curve 134' indicates the associated projection of the energy distribution received by detector element 132'.

As shown best in FIG. 5a, the drive motor 129 of the scanning mirror 108 is connected by separate supply lines 114 through switch 114' to electronic drive system 116 and electronic braking system 113. This electronic braking system 113 is actuated by trigger pulse 122. A blocking signal can be transmitted over line 121 as shown in FIG. 6 This signal blocks the electronic drive system 116 and causes a synchronizing signal 119 (FIG. 5a) to be dispatched to the electronic braking system 113 which retards the speed of the scanning mirror 108.

FIG. 6 illustrates the operation of the electronic braking system 113. Retarding pulse 115 energizes an electro-magnetic brake 117 and lever arm 118 which impede the motion of scanning mirror 108. The retarding force is transmitted to the ferromagnetic materials 117' and 118' which are best shown in FIG. 6.

During the range finding operation, the scanning mirror 108 is moved only through a fraction, e.g., one-half, of the width of the image field, as shown in FIG. 8. The graph in FIG. 8 shows an improvement over the plot in FIG. 7 because the former has a flatter trailing portion of the curve of the scanning function 130. This produces the advantageous result depicted in FIG. 8. The projections of the detector element 132', which are indicated in broken lines, coincide relatively closely at the beginning and end of the range finding interval in contrast to FIG. 7. When the present invention is employed, the detector element 132 or 132', respectively, nearly always receives the laser energy corresponding to its field of view, while in FIG. 7 a large proportion of this energy, particularly in the extreme positions, is lost. The invention claimed in this application greatly enhances the range of a system which scans in the normal manner. After completion of the measuring procedure, the scanning mirror 108 is accelerated again to its initial frequency by means of the pulse 120 (FIG. 5).

As seen best in FIG. 5(a), incident thermal radiation is directed by the scanning mirror 108 through angled elements of the three-lens detector objective 110 and off of deflector 101 to detector 123. The laser radiation is incident along the same path during the range-finding operation. The laser radiation is predominantly $CO_2$ radiation in the wavelength range of 10.6 $\mu$m and is transmitted by the dichroic deflector 101 which functions as a spectrum divider. The laser energy is formed into an image by two-lens optical imaging system 128. Optical imaging system 128 may include an adjusting wedge (not shown) deployed at the end of a fiber optical system 125. The fiber, which may be of the KrS5 type, acts by means of multiple reflections as an optical integrator. The radiation emerging at its end is not aberated by any angular movement, although the radiation at the fiber entrance adopts various angular positions during the range finding procedure as a result of the movement of the scanning mirror 108. Radiation emerging from the output end of the fiber is imaged on a reduced scale on the detector 123. As an alternative, a convergent fiber or a convergent rigid optical element 125' may be employed to achieve a more favorable imaging scale. The dimensions of the entrance to the fiber must be large enough so that the image of the laser radiation; which is moved during the range finder operation, is fully detected by the fiber. This fiber optical system is capable of changing the course of the radiation by a particular angle which is mandated by the design constraints of any given system. In the embodiment depicted in FIG. 5a, the required angle is 90°.

The optical imaging system 126, which may comprise two lenses as shown in FIG. 5(a), is situated at the end of the fiber optical system which emits radiation. If the fiber optical system 125 has a uniform cross section, than the optical imaging system produces an image of reduced size.

After passing through the optical imaging system 126, radiation is deflected through 90° by deflecting prism 127 before it impinges upon detector 123. After deflection through prism 127, the radiation travels parallel to the infrared radiation.

In another embodiment which is not shown, the fiber optical system is constructed to converge in the direction of travel of the radiation. The optical imaging system then produces an image ratio of 1:1.

As illustrated in FIG. 5b, the fiber optical system 125 may be replaced by a rigid optical system. This configuration of discrete, conventional optical elements is designed in a tapering configuration in the direction of travel of the radiation. The radiation is constrained to travel by total internal reflection within the components and is directed to pass through the optical imaging system 126' and deflecting prims 127' to detector 123.

Both the number of lenses of individual objectives and the directions of travel of the thermal and laser radiation may be modified without departing from the essential idea of the invention.

In yet another embodiment of the present invention, a polygonal wheel may be used as the scanning element.

Although the present invention has been described in detail with reference to particular preferred embodiments, persons possessing ordinary skill in the art to which this invention pertains will appreciate that various enhancements may be made without departing from the spirit and scope of the invention.

What is claimed is:

1. A laser rangefinder and thermal imager apparatus comprising:
   a laser transmitter having an optical axis;
   a thermal imager having an optical axis which is aligned parallel to said optical axis of said laser transmitter;
   a common thermal imaging/laser reception channel which includes:
   an IR telescope;
   a deflection element; and
   a scanning element;
   said common thermal imaging/laser reception channel further including:
   a detector objective;
   a detector; and
   a corresponding light emitting diode which converts received radiation into visible light;
   drive means mechanically coupled to said deflection element for controlling and compensating for the angular movement of said scanning element during a range measuring operation; and
   synchronizing means for coordinating the movement of said scanning element and said deflection element, said synchronizing means further coordinating the operation of said laser transmitter with the movement of said scanning element.

2. Apparatus according to claim 1, in which said optical axis of said laser transmitter and said thermal imager are locked by said synchronizing means which includes an electromagnetic device.

3. Apparatus according to claim 1, in which said synchronizing means includes an electro-optical clamping circuit.

4. Apparatus according to claim 1, which includes:
logic circuit means coupled to a position sensor for detecting the position of said scanning element.

5. Apparatus according to claim 1, in which said synchronizing means is at least one steerable rotary wedge located between said common thermal imaging laser reception channel and said scanning element.

6. Apparatus according to claim 5 in which said steerable rotary wedge is located between said scanning element and said detector.

7. Apparatus according to claim 1, in which said synchronizing means is a deflection mirror located between said scanning element and said detector.

8. Apparatus according to claim 1, in which said synchronizing means is a plane plate located between said scanning element and said detector.

9. Apparatus according to claim 4, in which said logic means instructs said synchronizing means to compensate for the motion of said scanning element by moving said scanning element by a predetermined amount when said scanning element transmits a preselected zero position.

10. Apparatus according to claim 1 which includes a rotatable deflection mirror that functions as a right-angle folding mirror in said detector objective.

11. Apparatus according to claim 1, in which said scanning element is a polygonal wheel.

12. Apparatus according to claim 10, in which a detector senses the movement of said rotatable deflection mirror.

13. Apparatus according to claim 1, in which said drive means is a piezoelectric drive mechanism.

14. Apparatus according to claim 1, in which the speed of said scanning element's movement is reduced during said range measuring operation and is subsequently increased again to its initial frequency.

15. Apparatus according to claim 1, in which said scanning element is moved only through a fraction of the width of the image field during said range measuring operation.

16. Apparatus according to claim 1, in which said scanning element is retarded by a retarding pulse during said range measuring operation and is accelerated again to is normal scanning frequency by an accelerating pulse after said range measuring operation is completed.

17. Apparatus according to claim 16, in which at least one motor drives said scanning element and is coupled by at least one separate supply line to an electronic braking system which includes a control device.

18. Apparatus according to claim 17, in which said retarding pulse is generated by said control device and is directed to said electronic braking system which acts on said scanning element by actuating an electromagnetic brake.

19. Apparatus according to claim 18, in which said electromagnetic brake impinges upon said scanning element through a lever arm.

20. Apparatus according to claim 1, in which said deflection element is parallel to said scanning element and is a spectrum divider which reflects thermal radiation in the direction of said detector and transmits laser radiation.

21. Apparatus according to claim 20, in which laser radiation passing through said deflecting element is imaged on said detector by an imaging means which includes a fiber optical system.

22. Apparatus according to claim 20, in which laser radiation passing through said deflection element is imaged on said detector by an imaging means which includes a rigid optical system.

23. Apparatus according to claim 21, in which said imaging means which includes said fiber optical system forms a convergent radiation pattern toward the direction of said detector.

24. Apparatus according to claim 22, in which said imaging means which includes said rigid optical system forms a convergent radiation pattern toward the direction of said detector.

25. Apparatus according to claim 21, in which said imaging means, which includes said fiber optical system, forms an image on said detector using a deflector prism.

26. Apparatus according to claim 22, in which said imaging means, which includes said rigid optical system, forms an image on said detector using a deflecting prism.

27. Apparatus according to claim 21 which includes an adjusting wedge between said deflection element and said fiber optical system.

28. Apparatus according to claim 22 which includes an adjusting wedge between said deflection element and said rigid optical system.

29. Apparatus according to claim 19, in which said retardation of the speed of said scanning element is initiated by a signal generated by said drive means.

30. Apparatus according to claim 19, in which said electronic braking system blocks the action of said drive means by generating a blocking signal.

* * * * *